H. L. DOHERTY.
GAS PRODUCING AND CONSUMING APPARATUS.
APPLICATION FILED APR. 14, 1909. RENEWED FEB. 15, 1911.

990,714.

Patented Apr. 25, 1911.

3 SHEETS—SHEET 1.

WITNESSES:

INVENTOR
Henry L Doherty
BY
Frank S. Young,
ATTORNEY

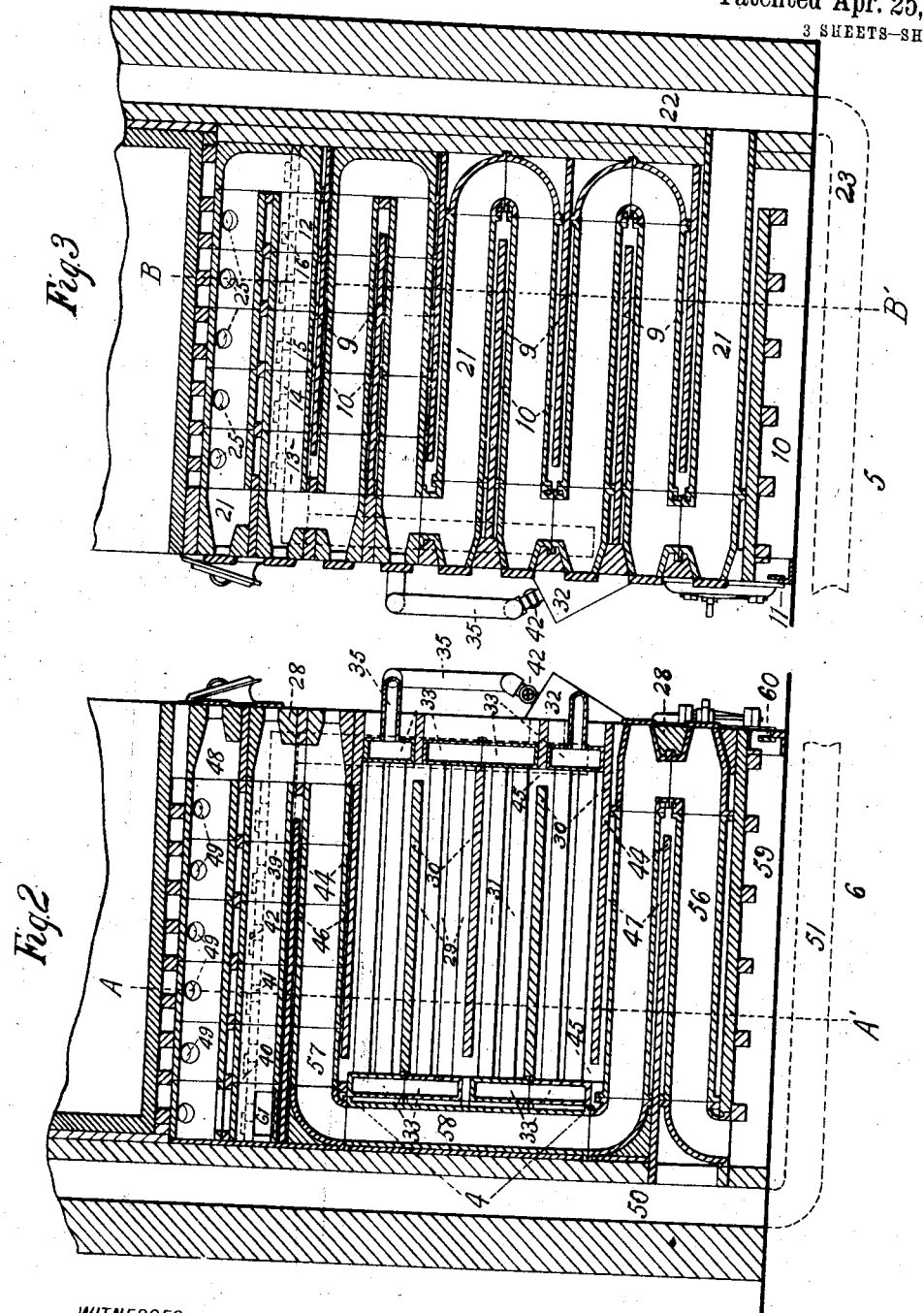

H. L. DOHERTY.
GAS PRODUCING AND CONSUMING APPARATUS.
APPLICATION FILED APR. 14, 1909. RENEWED FEB. 15, 1911.

990,714.

Patented Apr. 25, 1911.
3 SHEETS—SHEET 3.

WITNESSES

INVENTOR
Henry L. Doherty
BY
Frank S. Young,
ATTORNEY

UNITED STATES PATENT OFFICE.

HENRY L. DOHERTY, OF NEW YORK, N. Y.

GAS PRODUCING AND CONSUMING APPARATUS.

990,714. Specification of Letters Patent. Patented Apr. 25, 1911.

Application filed April 14, 1909, Serial No. 489,784. Renewed February 15, 1911. Serial No. 608,709.

*To all whom it may concern:*

Be it known that I, HENRY L. DOHERTY, a citizen of the United States, residing at New York city, in the county of New York and State of New York, have invented new and useful Improvements in Gas Producing and Consuming Apparatus, of which the following is a specification.

My invention relates to gas producing and consuming apparatus, and, in particular to apparatus comprising in combination; a gas producer in which coal or other fuel is burned in most part to carbon monoxid, and in which the temperature control thereof is secured by the introduction of regulated amounts of the waste gases from the combustion of the producer gas; a furnace in which the gas from the producer is burned; and air-heating recuperators for heating the air supplied for combustion by the, otherwise, waste heat of the products of combustion themselves.

In a co-pending application, Ser. No. 486887, I have described and claimed, in apparatus of the kind referred to, the process of regulating the temperature of the fuel bed of gas producers by introducing thereinto a current of mingled air and products of combustion.

My present invention relates to the apparatus which furnishes the means for the practical utilization of the above mentioned process.

The objects of my invention are to conserve as large a proportion as possible of the heat carried out of the furnace of the apparatus by the waste gases of combustion, and to regulate and control the temperature of the fuel bed in the producer of the apparatus more effectively than has heretofore proven practicable of attainment in all cases.

In the accompanying drawings I have shown an apparatus suitable for carrying out my invention. The particular application of my invention which I have selected for the purpose of illustration being, that to a combined gas producer and retort oven, commonly known as a gas bench.

Figure 1:
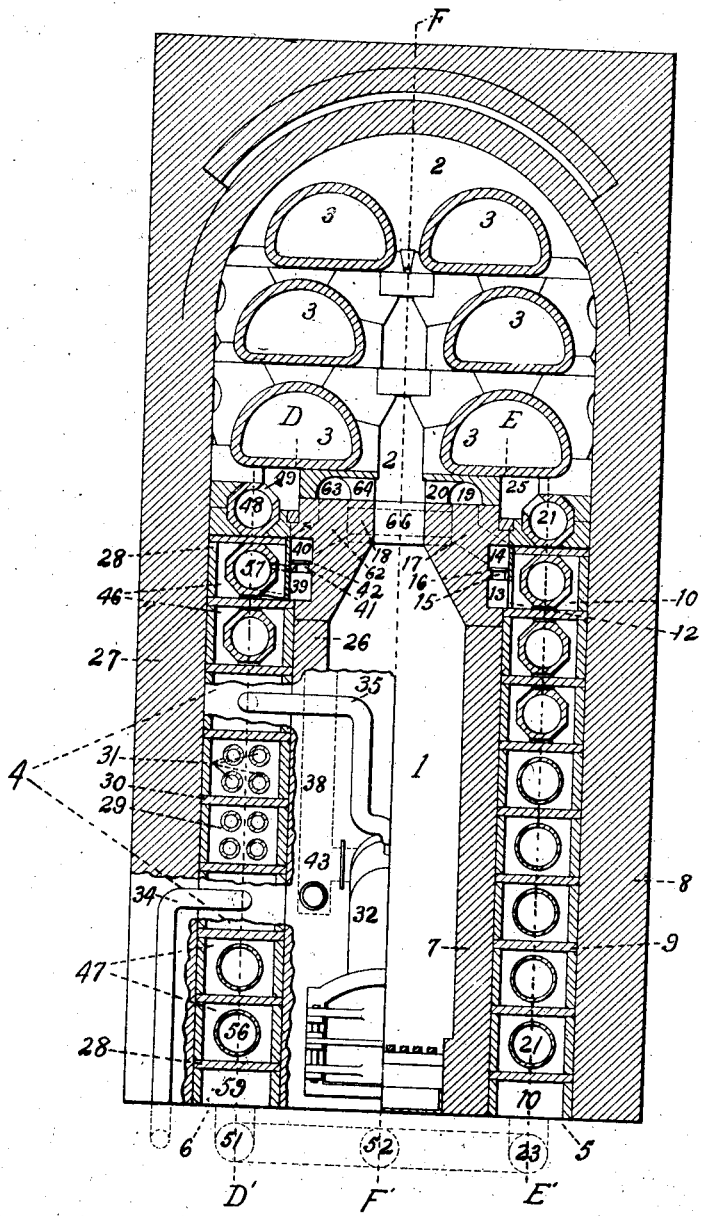
Figure 5:
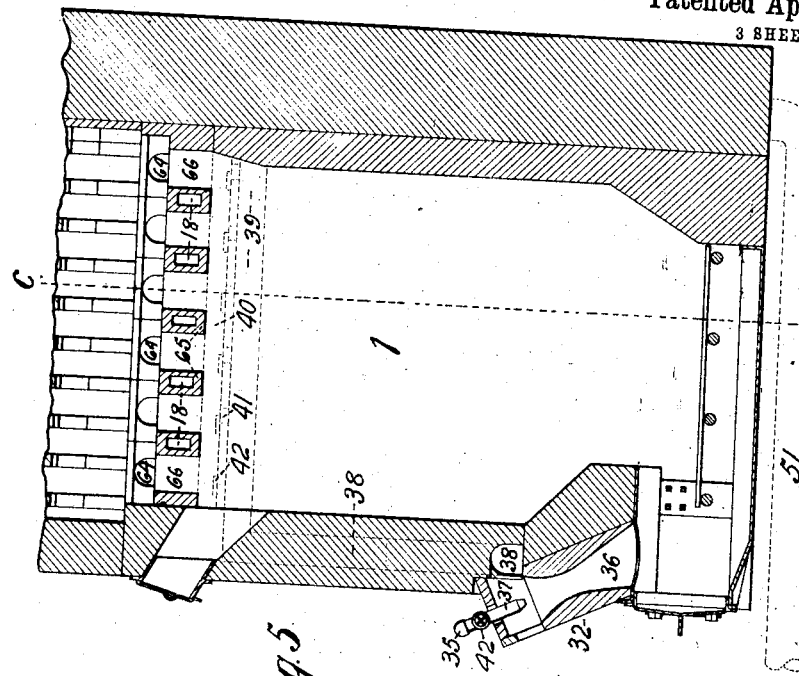
Figure 4:
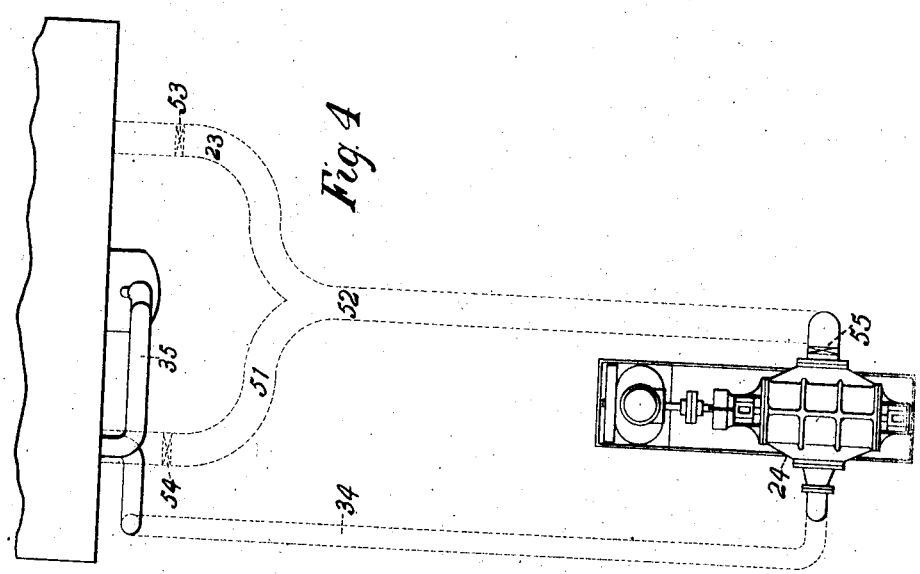

Figure 1, is a view showing a part cross-section of the gas bench on a vertical plane through the line A A' of Fig. 2, B B' of Fig. 3, and C C' of Fig. 5, and the rest in elevation, the latter showing the injector, with its connections. Fig. 2 is a section through the left-hand recuperator of the gas bench on the line D D' of Fig. 1. Fig. 3 is a section through the right-hand recuperator on the line E E' of Fig. 1. Fig. 4 is a part plan of the apparatus showing the compressor or blower and the connections from the same to the gas bench. Fig. 5 is a vertical longitudinal section of the gas bench on the line F F' of Fig. 1.

In the several views, 1 is the gas producer, 2 the retort-oven containing the retorts 3.

5 and 6 are preheaters or recuperators located, respectively, on the right and left sides of the gas producing chamber 1.

4 is a recuperator forming part of 6 for reheating the products of combustion on their way to the producer.

The recuperator 5 occupies a compartment between the right-hand wall 7 of the gas-producing chamber 1 and the right-hand arch-wall 8 of the gas bench. This compartment is divided by staggered horizontal partitions 9 into a number of horizontal flues, each connected at opposite ends with the flues lying next above and below. The result is that the horizontal flues form together a return-bend flue 10. At the outer end of the lowest section of 10 is an air damper or register 11 which controls the admission of air thereto. The uppermost section of 10 communicates through a port 12 with the lower of a set of two equalizing flues designated by 13 and 14. Ports 15 establish communication between 13 and 14 at various points along the length of the same. Covering the orifices or ports 15 are tiles, 16, which may be adjusted by means of a metal rod or hook introduced through an appropriate hand-hole in the front of the bench so as to cover more or less of the ports 15. By means of these tiles it is evident that the flow of air from 13 and 14 may be made uniform along the length of the flues. Opening out of 14 are a set of short flues 17. These communicate with cross flues 18 and a horizontal flue 19, running longitudinally of the retort-oven. Opening out of port 19 are a number of ports or nostrils 20. Located within and enveloped by the return-bend flue 10 is another return-bend flue 21. The upper sections of 21 are of fire clay or other refractory material while the lower sections are preferably of metal. In the upper part of the recuperator the temperature is, approximately; 1600 to 1800° Fah., which is, of course, too hot for ordinary metal flues to endure. Besides, at this temperature, I have found that the heat transmission through fire clay is nearly if not quite equal to the transmission through iron at ordinary temperatures. By using fire clay for the hottest sections and metal for the cooler sections of flue 21 I secure a construction that permits of the highest practicable rate of heat transmission from the producer gas to the air. The lowest section of flue 21 communicates with a stack flue 22 and another flue 23 leading to the blower 24. The upper section of 21 has orifices 25 which establish communication between the retort-oven 2 and the flue 21. Part of the products of the combustion of the producer gas generated in the gas producer, enter the flue 21 through the orifices 25, pass through 21 and through the flue 22 to the stack, or through 23 to the blower. The air entering at 11 passes through the recuperator 5 by means of the flue 10 in a direction parallel but opposite to the current of products of combustion passing through 21. The result is that the air current takes up the heat from the latter and discharges through the air nostrils 20 into the retort-oven at a temperature approximating the one at which the products of combustion enter the flue 21.

The recuperator 6, occupying a compartment included between the left-hand wall of the producer 26, and the left-hand wall 27 of the bench, is divided into two distinct recuperators, one for heating air and one for reheating products of combustion, which I will designate by 28 and 4, respectively.

The recuperator 4 occupies a position in the middle of recuperator 28. This is because the products of combustion which pass through 4 enter at a temperature approximating 400 or 500° Fah. Since, in practice, a temperature differential of about 200° Fah. between the heating and the heated medium is desirable I aim to place the recuperator 4 in such a position in 28 that the heating current of products of combustion discharging from 4, shall be at about 700° Fah. In the design of apparatus shown the reheater 4 is divided into a return-bend flue 29 by staggered horizontal partitions 30. 29 receives the products of combustion that have passed through the upper part of recuperator 28 and discharges them into the lower part of 28.

Located in 29 is a return-bend flue 31 for the current of products of combustion going to the injector 32. This flue 31 is made up of a number of horizontal sections, which consist of a number of pipes (four in the design shown) which enter headers, 33, at either end. These headers are alternately separated and connected so as to form a return-bend flue, the horizontal sections of which are composed of a number of parallel pipes. The products of combustion or flue gases going to the injector enter the lower end of 31 from the pipe 34, which is the discharge pipe from the blower 24, pass through 31, being at the same time heated by the hot current of products of combustion passing through 29 in a direction parallel but opposite to the current passing through 31, and leave the reheater 4 by the pipe 35.

The injector 32 may be of any suitable type, and in the design shown is essentially a nozzle-shaped passage 36 having an inner nozzle 37 through which the flue gas under pressure is discharged into the converging portion of the passage 36, which is connected through the two flues, 38, (one for each air recuperator) with the flues 13 and 39. The current of compressed flue gas discharging through 37, in the well known manner, draws down through 38 a portion of the heated air from the flues 13 and 39, and forces the mixture of heated air and flue gas into the inclosed ash-pit of the producer. The relative proportions of flue gas and air are regulated by means of the valve 42, the pressure under which the flue gas is supplied to the injector and by manipulating the dampers 43, one on each of the flues 38.

The air recuperator 28, is divided into a number of horizontal flues by staggered horizontal partitions 44, the partitions being of such a length as to leave ports 45, through which communication is established between the different sub-flues. It is evident that the arrangement furnishes two return-bend flues, 46 and 47, connected by the return-bend flue 29 of reheater 4, so that the three flues, 46, 29 and 47, form in reality one continuous flue through the recuperators 28 and 4.

The upper end of 46 is connected with the flue 48, the latter having orifices 49 which establish communication between 48 and the retort-oven. The discharge end of 47 communicates with the stack flue 50. A flue 51 is connected with 50 and with the suction pipe 52 of the blower 24. Dampers, 53, 54 and 55 on 23, 51 and 52, respectively, serve to regulate the flow of products of combustion through the respective pipes.

Located within the flues 46 and 47 are return-bend flues 56 and 57, respectively, joined by the connection 58, so as to form a continuous path through the recuperator for the air current from the intake flue 59 to the equalizing flue 39. A damper 60 regulates the admission of air to the flue 59. A port 61 establishes communication between the uppermost section of 46 and the equalizing flue 39. The system of flues, 39, 40, 62, 63 and 64, are exactly similar in construction and function to the corresponding flues, 13, 14, 17, 19 and 20, of recuperator 5, and need no further description. The function of the cross flues 18 is to equalize the distribution of the air between the two sets of air nostrils 20 and 64. This cross flue 18 is in the design shown formed by the hollow arch-keys 65. Between the keys 65 are left the openings or nostrils 66, which afford a passage for the producer gas formed in the producer 1 to the combustion chamber of the retort-oven 2.

The gas passing through 66, meeting the air entering through 20 and 64, burns. The products of the combustion pass upward and around the retorts 3, and thence through the orifices 25 and 49, and thence through the combustion gas flues of recuperators 5 and 6 to the stack flues 22 and 50. From 22 and 50 the products of combustion pass, in part, to the blower 24 and the remainder to the stack.

The object of passing back to the gas producer a portion of the products of combustion is for the purpose of controlling the temperature in the fuel bed of the gas producer by utilizing the excess heat in the producer to decompose the carbon dioxid of the portion of products of combustion returned to the producer with the formation of carbon monoxid by reaction with the carbon of the fuel bed. In the processes referred to the method of introducing the draft current (mixture of air and products of combustion) is the reverse of that herein described. In the operation of this apparatus I use a jet of compressed flue gas to induce a current of air, whereas in the processes referred to I use a jet of compressed air to induce a current of products of combustion. This affords a more positive control over the volume of flue gas introduced. Sometimes, where an excess of air is used, the proportion of carbon dioxid in the flue gas is so small that to secure a proper temperature control the volume of the latter must be in excess of the former. When this is the case, unless the air is supplied under an uneconomically high pressure, it is difficult to introduce sufficient flue products into the draft current. On the other hand, when the flue gas is compressed and used as a jet to induce the air current the volume of flue gas in the mixture may be increased to any desired extent.

The reaction whereby the temperature control is effected is the one fully described in the Letters Patent referred to, viz.,

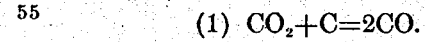
(1) $CO_2 + C = 2CO$.

The predominating producer reaction is,

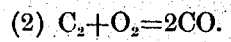
(2) $C_2 + O_2 = 2CO$.

This reaction liberates about 4450 B. T. U. per pound of carbon so consumed, and will, if allowed to proceed unmodified, establish a temperature of about 2700° Fah. in the bed of fuel. This is far above the sintering temperature of most fuels, and in order to avoid the annoyances, and loss of economy incident to the sintering of the ash of the fuel, I utilize the reaction (1) to absorb as much of the excess heat developed by reaction (2) as will keep the temperature in the fuel bed at between about 1600 and 1800° F.

In order to secure the highest economy of operation it is necessary to provide some way of retaining in or restoring to the system the heat carried out of the retort-oven by the products of combustion. Since it is necessary to maintain the walls of the retorts at about 1900 to 2000° Fah. in order to secure a carbonizing temperature in the charges within the retorts, it is manifest that the products of combustion must be permitted to leave the oven at about that temperature. Now, the proportion of the total heat developed which is contained in the products of combustion at 1800–2000° Fah. is about 55 to 60%. The only way in which this heat can be recovered and saved to the system is to utilize it to preheat the air supplied for the combustion. But the heat capacity of the air required for the secondary combustion is only about 60% of the total heat carried by the products of the combustion leaving the retort-oven, since it is, of course, practically impossible to heat the air above about 1800° F.

I have, now, in this present invention, described and claimed, a means by which the greater part of this otherwise unavailable heat may be saved and utilized.

At first thought it may seem illogical to supply additional heat to the gas producer when I am purposely introducing combustion gases containing carbon dioxid to keep down the temperature therein. As a matter of fact, however, this results in a very decided gain in the volume of the chief combustible constituent of the producer gas, viz., carbon monoxid, that is produced for a given weight of carbon consumed in the producer. The greater the amount of heat that I can introduce into my producer, the greater is the proportion of carbon dioxid that I can reconvert into the useful gas-carbon monoxid. Since this reaction (1) gives double the volume of carbon monoxid for a given weight of carbon consumed on the grate of the producer, as is given by the reaction with the oxygen of the air (reaction 2) it is plain that for every B. T. U. of sensible heat that I supply to the producer I obtain a B. T. U. of latent or potential heat, which is returned in an available form to the retort-oven.

The practical heat capacity of the primary and secondary air, alone, is not sufficient to take up the heat carried out of the retort-oven by the products of combustion, and therefore if I depended upon the air alone to restore this heat to the system there would still be a large unavoidable waste. By the means which I have herein described and claimed for taking up part of the sensible heat of the flue gases in the portion thereof which I use to control the temperature in the producer, I have left for the air to take up only a quantity of heat fairly commensurate with its practical capacity. By the process described in the Letters Patent, above referred to, the preheating of the primary air is not practicable owing to the fact that the volume of flue gas which must then be introduced is greater than can be economically handled by the air jet.

By the means which I have herein described and claimed I have overcome the difficulties in the way of a thorough recuperation of the heat of the waste gases from the retort oven, and increased the efficiency of the gas bench to that extent.

Having described my invention, what I claim is:

1. In a combined gas producing and gas consuming apparatus, the combination of a gas producer; a furnace for burning producer gas; recuperators for transferring heat from the products of combustion leaving said furnace to an air current; means for compressing a portion of the products of combustion leaving said recuperators; means for introducing such portion of the products of combustion and a portion of such heated air into the said gas producer; and means for introducing the remainder of such heated air into said furnace, all substantially as described.

2. The combination of a gas producer; a furnace for burning the gas from said producer; recuperators for heating air by the products of combustion from said furnace; means for compressing a portion of the products of combustion after they have passed through said recuperators; means for reheating said compressed products of combustion; means for introducing said reheated products of combustion together with a portion of the said heated air current, into said gas producer; and means for introducing the remainder of said heated air into said furnace, substantially as described.

3. In a combined gas producing and gas consuming apparatus, the combination of recuperators for heating the air supplied to the gas producing apparatus and the air supplied to the gas consuming apparatus in a common current; means for reheating a part of the products of combustion from the gas consuming portion of the apparatus after they have passed through said recuperators; and means for introducing said reheated products of combustion in admixture with a portion of said current of heated air into the gas producing portion of said apparatus, substantially as described.

4. In a combined gas producing and gas consuming apparatus, the combination of recuperators for heating the air supplied to the gas producing apparatus and the air supplied to the gas consuming apparatus in a common current; means for compressing a part of the products of combustion from the gas consuming apparatus after they have passed through said recuperators; an inductor having its induction chamber in communication with the air flues of said air recuperators, its discharge end in communication with the gas producing portion of said apparatus beneath the fuel bed thereof, and a nozzle through which the said compressed products of combustion are discharged, whereby a portion of the heated air is withdrawn from said heated air current and mixed with the said compressed products of combustion and the gaseous mixture introduced into the gas producing portion of the apparatus, substantially as described.

5. In a combined gas producing and gas consuming apparatus, the combination of recuperators for heating the air supplied to the gas producing apparatus and the air supplied to the gas consuming apparatus in a common current; means for compressing a part of the products of combustion from the gas consuming apparatus after the same have passed through said recuperators; a recuperator for reheating said compressed products of combustion; an inductor having its induction chamber in communication with the air flues of said air recuperators, its discharge end in communication with the gas producing apparatus beneath the fuel bed thereof, and a nozzle through which the said compressed and heated products of combustion are discharged whereby a portion of the heated air is withdrawn from the said air recuperators, through said inductor and mixed with the products of combustion discharging through said nozzle and the gaseous mixture introduced into said gas producing apparatus beneath the fuel bed thereof, substantially as described.

6. The combination of a gas producer; a furnace for burning the gas generated in said gas producer; recuperators for heating the air for said gas producer and said furnace, comprising, passages for air and separate passages for products of combustion from said furnace; passages connecting the air passages of said recuperators with said furnace and passages connecting said air passages with the induction chamber of an inductor; an inductor; a passage connecting the discharge end of said inductor with the gas producer; means for compressing a portion of the combustion gases from said furnace after they have passed through said recuperators; and a passage connecting said compressing means with the induction nozzle of said inductor, whereby a current of heated air and products of combustion is introduced into said gas producer, substantially as described.

7. In a gas bench, the combination of a gas producer, a furnace for burning the gas generated in said gas producer; recuperators for heating the air supplied to said gas producer and said furnace, each of said recuperators comprising a return-bend flue for products of combustion and located within said products-of-combustion flue a return-bend flue for air; two equalizing flues having a plurality of ports establishing communication between them along the length thereof, dampers on said ports, a port establishing communication between the uppermost section of said return-bend flue for air and the lower of said equalizing flues; a plurality of passages connecting the upper of said equalizing flues with said furnace; an inductor having its discharge end in communication with the gas producer below the fuel bed thereof; passages connecting said inductor with the air flues of said recuperators; and a means for discharging a current of products of combustion through the nozzle of said inductor, whereby a portion of the heated air passing through said air flues is diverted to said inductor and admixed with the current of products of combustion passing therethrough and the combined currents of heated air and products of combustion introduced into said gas producer, substantially as described.

8. In a gas bench the combination of a gas producer; a furnace for burning the gas generated in said gas producer; recuperators for heating the air for said gas producer and said furnace in a common current, each of said recuperators comprising a return-bend flue for products of combustion, and, located within and enveloped by said products-of-combustion flue, a return-bend flue for air; two equalizing flues having a plurality of ports establishing communication between said equalizing flues, dampers on said ports; a port establishing communication between the uppermost section of said return-bend flue for air and the lower of said equalizing flues; a plurality of passages connecting the upper of said equalizing flues with said furnace; an inductor having its discharge end in communication with the gas producer beneath the fuel bed thereof; passages connecting said inductor with the air flues of said recuperators; a means for compressing a portion of the products of combustion from said furnace after they have passed through said recuperators; a recuperator for heating said compressed products of combustion; a passage connecting such recuperator, with the induction nozzle of said inductor; substantially as described.

9. In a gas bench the combination of a gas producer; a furnace for burning the gas generated in said gas producer; recuperators for heating the air for said gas producer and said furnace in a common current, each of said recuperators comprising a return-bend flue for air, a damper on the inlet end of said air flue, two equalizing flues having a plurality of ports establishing communication between said flues, dampers on said ports, a port establishing communication between the uppermost section of said return-bend flue for air and the lower of said equalizing flues, a return-bend flue for products of combustion enveloping said return-bend flue for air and having its uppermost section in communication with the furnace at the part thereof where the products of combustion are discharged therefrom and its lowest section in communication with a chimney flue; a plurality of passages connecting the upper of said equalizing flues of each recuperator with the combustion chamber of said furnace; a plurality of cross flues cross-connecting the said plurality of passages of each recuperator; flues connecting the lowermost section of the products-of-combustion flue of each recuperator with a draft-accelerating means; a reheater for reheating a portion of the products of combustion, said reheater comprising a return-bend flue for products of combustion, a port connecting the uppermost section of said return-bend flue for products of combustion with one of the sections of the products-of-combustion flue of one of the air recuperators, and a port connecting the lowermost section of said return-bend flue for products-of-combustion with another one of the sections of the products-of-combustion flue of the said air recuperator, a return-bend flue for reheating products of combustion located within and enveloped by said products of combustion flue; a draft accelerating means; an inductor discharging beneath the grate of said gas producer; a passage connecting the said draft-accelerating means with one extremity of the products-of-combustion-reheating flue, of said reheater for products of combustion, and a passage connecting the other extremity of said products-of-combustion-reheating flue of said reheater with the induction nozzle of said inductor, all substantially as described.

10. In a gas bench the combination, of a gas-producer; a furnace for burning the gas generated in said gas producer; recuperators for heating air for said gas producer and said furnace in a common current, each of said recuperators comprising a return-bend flue for air; a damper on the inlet-end of said air flue, two equalizing flues having a plurality of ports establishing communication between said flues, dampers on said ports, a port establishing communication between the uppermost section of said return-bend flue for air and the lower of said equalizing flues, a return-bend flue for products of combustion enveloping said return-bend flue for air and having its uppermost section in communication with the furnace at the part thereof where the products of combustion are discharged therefrom and its lowest section in communication with a chimney flue; a plurality of passages connecting the upper of said equalizing flues of each recuperator with the combustion chamber of said furnace; a plurality of cross-flues cross-connecting the said plurality of passages of each recuperator; flues connecting the lowermost section of the products-of-combustion flue of each recuperator with a draft-accelerating means; a reheater for reheating a portion of the products of combustion, said reheater comprising a return-bend flue for products of combustion, a port connecting the uppermost section of said return-bend flue for products of combustion with one of the sections of the products-of-combustion flue of one of the air recuperators, and a port connecting the lowermost section of said return-bend flue for products-of-combustion with another one of the sections of the products-of-combustion flue of the said air recuperator, a return-bend flue for reheating products of combustion located within and enveloped by said products-of-combustion flue, said reheating flue comprising, a plurality of sections, and having the adjacent sections connected alternately front and rear, each of said sections comprising a plurality of flues connected to headers at each end, the adjacent headers being alternately in communication with and separated from each other, thus establishing communication between adjacent sections alternately in front and rear; a draft-accelerating means; an inductor discharging beneath the grate of said gas producer; a passage connecting the said draft accelerating means with one extremity of the products-of-combustion-reheating flue of said reheater for products of combustion, and a passage connecting the other extremity of said products-of-combustion-reheating flue of said reheater with the induction nozzle of said inductor, all substantially as described.

Signed at New York city, in the county of New York and State of New York this 10th day of April, 1909.

HENRY L. DOHERTY.

Witnesses:
Louis F. Musil,
C. B. Gilbert.